United States Patent
Berthevas et al.

(10) Patent No.: US 9,682,616 B2
(45) Date of Patent: Jun. 20, 2017

(54) STRUCTURAL AIR GUIDE HAVING MULTIPLE CONFIGURATIONS FOR A TECHNICAL FRONT SURFACE OF A MOTOR VEHICLE AND VEHICLE COMPRISING SAME

(71) Applicant: RENAULT s.a.s., Boulogne Billancourt (FR)

(72) Inventors: Fabrice Berthevas, Gometz le Chatel (FR); Michael Flandin, Broue (FR); Yannick Bignon, Le Plessis Robinson (FR)

(73) Assignee: RENAULT s.a.s., Boulogne Billancourt (FR)

( * ) Notice: Subject to any disclaimer, the term of this patent is extended or adjusted under 35 U.S.C. 154(b) by 9 days.

(21) Appl. No.: 14/355,886

(22) PCT Filed: Oct. 30, 2012

(86) PCT No.: PCT/EP2012/071463
§ 371 (c)(1),
(2) Date: May 2, 2014

(87) PCT Pub. No.: WO2013/064488
PCT Pub. Date: May 10, 2013

(65) Prior Publication Data
US 2015/0068825 A1 Mar. 12, 2015

(30) Foreign Application Priority Data
Nov. 2, 2011 (FR) .................. 11 59927

(51) Int. Cl.
*B60K 11/04* (2006.01)
*B60K 11/08* (2006.01)
*B62D 25/08* (2006.01)

(52) U.S. Cl.
CPC .............. *B60K 11/08* (2013.01); *B60K 11/04* (2013.01); *B62D 25/084* (2013.01)

(58) Field of Classification Search
CPC ....... B60K 11/06; B60K 11/08; B60K 11/085; F01P 11/10
See application file for complete search history.

(56) References Cited

U.S. PATENT DOCUMENTS 2,783,978 A * 3/1957 Baumgarten ............... 165/44
4,169,501 A * 10/1979 Takeuchi et al. ........... 165/126
(Continued)

FOREIGN PATENT DOCUMENTS

DE 10 2004 026 419 12/2005
EP 1 216 872 6/2002
(Continued)

OTHER PUBLICATIONS

French Search Report Issued Jul. 9, 2012 in Application No. FR 1159927 Filed Nov. 2, 2011.

(Continued)

*Primary Examiner* — J. Allen Shriver, II
*Assistant Examiner* — Travis Coolman
(74) *Attorney, Agent, or Firm* — Oblon, McClelland, Maier & Neustadt, L.L.P.

(57) ABSTRACT

A structural air guide configured to be built into a front of a vehicle in an engine compartment of the vehicle. The air guide forms a substantially rectangular structure including a front surface, a rear surface, and an upper edge, and the structure including at least one built-in radiator and a mechanism securing the radiator to the structure of the vehicle. The rear surface forms a housing for receiving a cooling module including at least the radiator, the module including a sealing mechanism that co-operates with the housing. The upper edge includes at least one zone for (Continued)

securing equipment of the technical front surface. The housing for the cooling module, which is located behind the structural air guide, can receive the module in one of at least two positions, namely forward or rearward.

14 Claims, 4 Drawing Sheets

(56) References Cited

U.S. PATENT DOCUMENTS

| | | | |
|---|---|---|---|
| 5,123,695 A * | 6/1992 | Kanemitsu et al. | 296/193.09 |
| 5,775,450 A * | 7/1998 | Porter et al. | 180/68.1 |
| 6,105,660 A * | 8/2000 | Knurr | 165/41 |
| 7,290,630 B2 * | 11/2007 | Maeda et al. | 180/68.4 |
| 7,451,844 B2 * | 11/2008 | Kunikata | 180/68.1 |
| 8,118,351 B2 * | 2/2012 | Gonin et al. | 296/193.09 |
| 8,302,714 B2 * | 11/2012 | Charnesky et al. | 180/68.1 |
| 8,365,854 B2 * | 2/2013 | Lee et al. | 180/68.1 |
| 8,485,295 B2 * | 7/2013 | Mildner | 180/68.1 |
| 8,491,050 B2 * | 7/2013 | Bauernfeind et al. | 296/193.09 |
| 8,646,552 B2 * | 2/2014 | Evans et al. | 180/68.1 |
| 8,682,526 B2 * | 3/2014 | Mola | 62/181 |
| 9,180,753 B2 * | 11/2015 | Kim | B60H 1/00885 |
| 2007/0068716 A1 * | 3/2007 | Kunikata | B60K 11/04 |
| | | | 180/68.4 |
| 2007/0209612 A1 * | 9/2007 | Kojima | B60H 1/322 |
| | | | 123/41.49 |
| 2009/0193829 A1 * | 8/2009 | Boudard | B60H 1/3201 |
| | | | 62/239 |
| 2010/0126438 A1 * | 5/2010 | Kim | B60K 6/32 |
| | | | 123/41.21 |
| 2010/0282533 A1 | 11/2010 | Sugiyama | |
| 2011/0226542 A1 * | 9/2011 | Steller | B60K 11/04 |
| | | | 180/68.4 |
| 2011/0304176 A1 * | 12/2011 | Kihara | B60K 11/04 |
| | | | 296/193.09 |
| 2012/0132401 A1 * | 5/2012 | Baek | F28D 15/0275 |
| | | | 165/104.21 |
| 2012/0241128 A1 * | 9/2012 | Vacca | B60K 11/085 |
| | | | 165/44 |

FOREIGN PATENT DOCUMENTS

| | | |
|---|---|---|
| EP | 2 248 693 | 11/2010 |
| FR | 2 950 574 | 4/2011 |
| FR | 2 967 375 | 5/2012 |
| JP | 2004 299446 | 10/2004 |

OTHER PUBLICATIONS

International Search Report Issued Mar. 25, 2013 in PCT/EP12/071463 Filed Oct. 30, 2012.

* cited by examiner

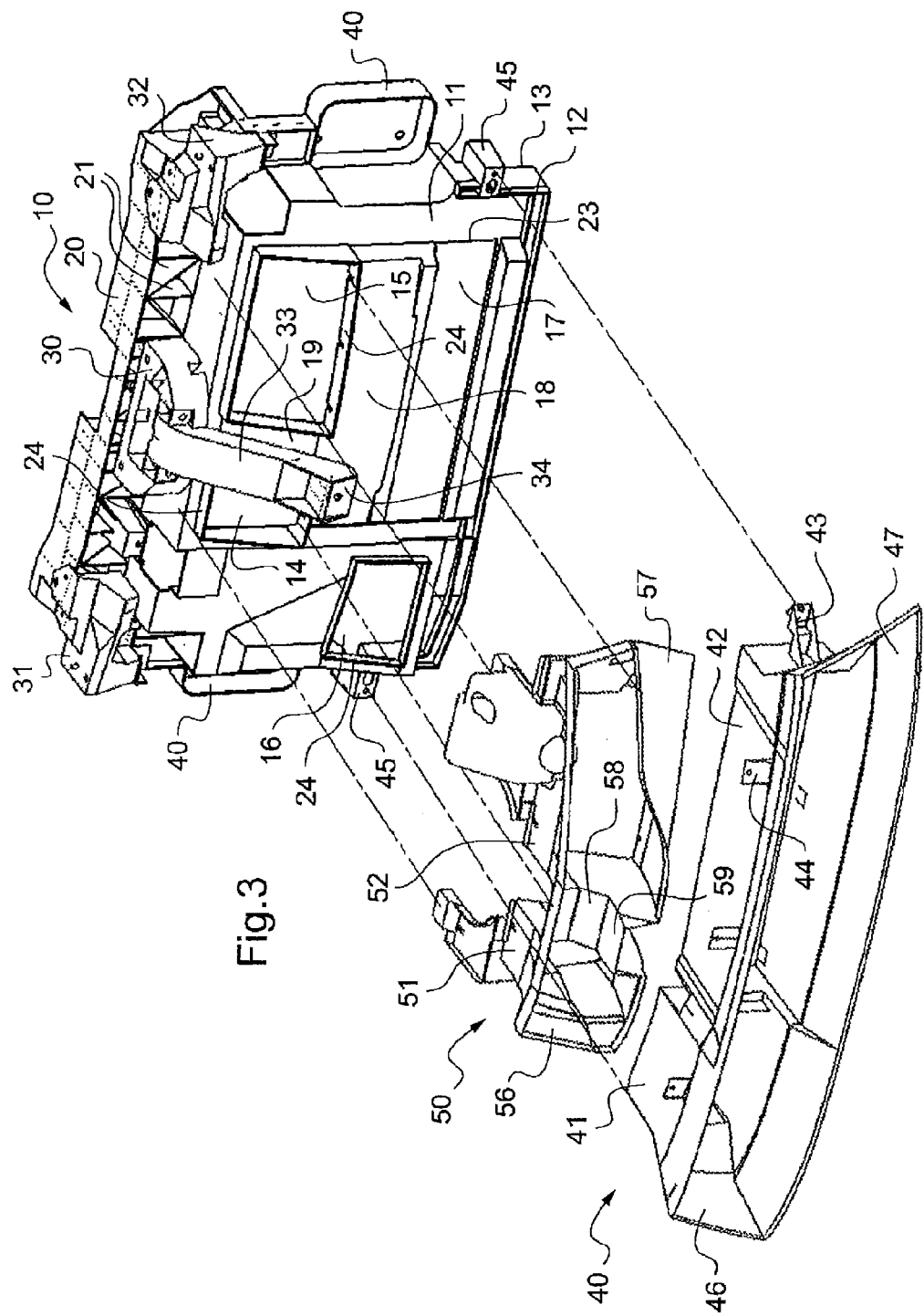

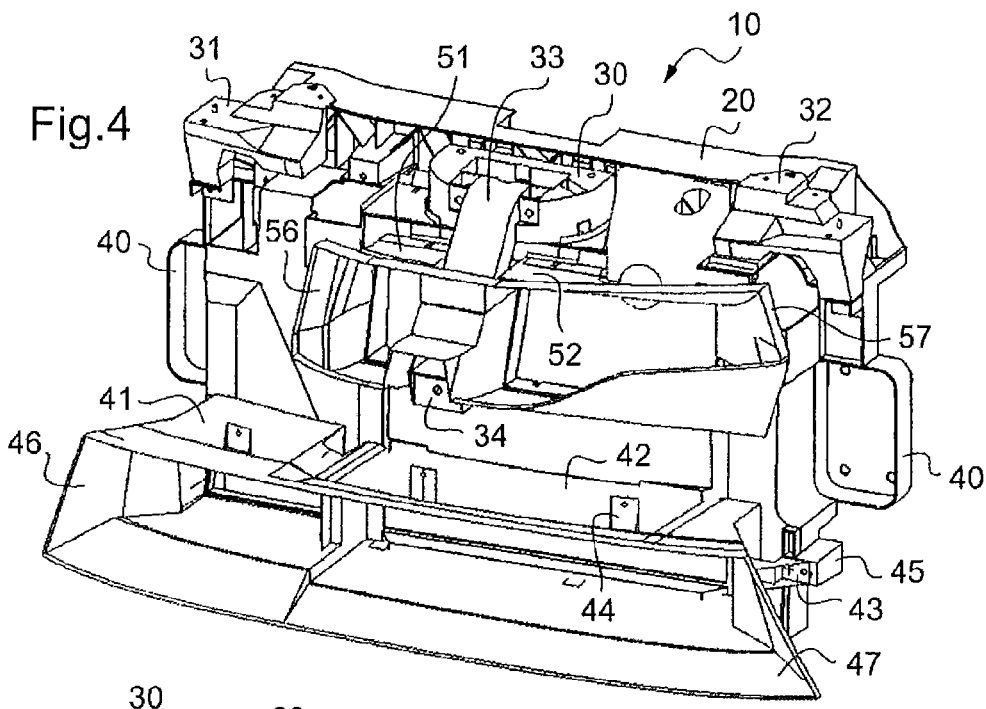
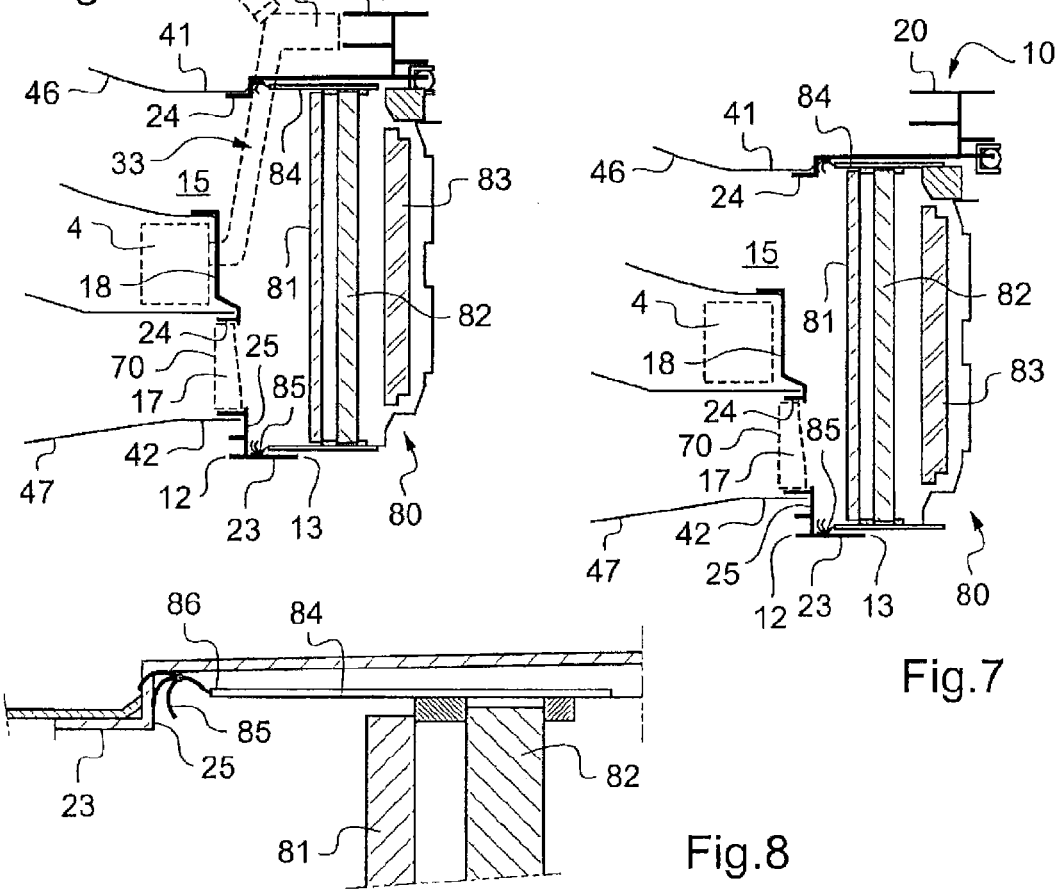

STRUCTURAL AIR GUIDE HAVING MULTIPLE CONFIGURATIONS FOR A TECHNICAL FRONT SURFACE OF A MOTOR VEHICLE AND VEHICLE COMPRISING SAME

BACKGROUND

The present invention relates to a modular arrangement of a vehicle technical front surface and more precisely to a structural air guide functioning as a technical front surface of a motor vehicle engine. It is a question of channeling the air entering via at least one ventilating opening or grille in the front face or front bumper skin of the vehicle in order to conduct it to a set of elements combined in what is termed a "cooling kit". This term is intended to denote all the elements necessary for cooling the engine, which are sometimes stacked in layers or are in part superposed; the cooling kit is conventionally composed of the engine cooling water radiator, of the optional charge air radiator (intercooler) and of the condenser.

The "technical front surface" is known in the art as a structure which is situated in front of the engine block and which has the function of supporting various components, mainly the radiator of the engine block. The technical front surface may take multiple forms. In certain cases, it amounts to a simple transverse beam. In other cases, it constitutes a chassis of more less complex form incorporating the cooling kit. The technical front surface incorporates various functions such as hood stop support, hood lock support or a strut supporting the hood lock etc.

Document EP 1 8 13485 discloses a technical front surface intended to be incorporated into the front of a vehicle in an engine compartment of said vehicle, behind at least one ventilating grille of a front face of the vehicle, the technical front surface being in the form of a substantially rectangular structure comprising in particular a front surface, a rear surface, and an upper border, said structure incorporating at least one radiator and comprising means for fastening to the structure of the vehicle.

A disadvantage of the technical front surface arrangement known from this document is that it cannot achieve adequate guiding of the air from the ventilating grille to the radiator. Another disadvantage is that this arrangement is specific to one vehicle model and that as many arrangement models as there are models of vehicles are required.

BRIEF SUMMARY

The aim of the invention is to provide a technical front surface arrangement which overcomes these disadvantages and makes it possible to obtain good air guiding and confinement while providing a partial standardization of the arrangement on a plurality of vehicles of the same range.

The invention achieves its aim by virtue of a structural air guide intended to be incorporated into the front of a vehicle in an engine compartment of said vehicle, behind at least one ventilating opening of a front face of the vehicle, the air guide being in the form of a substantially rectangular structure comprising in particular a front surface, a rear surface, and an upper border, said structure incorporating at least one radiator and comprising means for fastening to the structure of the vehicle, characterized in that:

the front surface comprises a zone for fastening at least one adaptive air guiding module intended to conduct the air from the ventilating grille to said front surface, the rear surface forms a housing for receiving a cooling kit comprising at least said radiator, the kit being equipped with sealing means co-operating with the receiving housing, the upper border comprises at least one zone for fastening technical front surface equipment modules, and in that the housing for receiving the cooling kit, situated at the rear of the structural air guide, can receive the kit in one or the other of at least two positions, respectively a forward or a rearward position.

Thus, by virtue of this constitution, the structural air guide part can easily be standardized for a plurality of vehicles of the same range, the specific adaptation to the model in question taking place only at the level of the adaptive air guide module fastened to the front of the standard structural air guide, at the level of the technical front surface modular equipment applied to the upper border, and at the level of the cooling kit itself which is housed in the housing for receiving the air guide. The forward position of the kit makes possible its adaptation to vehicles of which the engine and connected equipment are particularly bulky and require space. The rearward position of the kit makes possible, by contrast, an adaptation to less bulky engines and equipment at the rear of the technical front surface, which requires less space, thereby making it possible to promote the rearward positioning of the kit and to promote the performance of the vehicle in terms of repairability. Specifically, when the limited bulk of the engine makes it possible to place the cooling kit sufficiently at the rear of the air guide, said kit is therefore situated more rearwardly at the rear of the impact beam and is consequently less exposed to damage in the event of a Danner impact.

Advantageously, the upper border of the structural air guide is configured as a transverse beam, that is to say that it is provided with a transverse support capability, in particular in the case where it bears the cooling kit, (which is one option, the other option being to support the cooling kit by the crossmember below the radiator). The beam structure can in particular be obtained by a lattice structure with a set of ribs and/or partitions.

Advantageously, the fastening zone provided on the upper border of the structural air guide comprises a plurality of zones for accommodating and for fastening technical front surface equipment, in particular at the center and at the ends of the border. At the central part, a strut for a hood lock is typically fastened, said strut being able optionally to bear on an impact beam situated transversally just in front of the structural air guide. Hood stop supports are fastened, for example, on the lateral edges. These modular elements are adapted to each model of the range of vehicles and are advantageously fastened by a simple co-operation of shape (indexing) and screwing.

Advantageously, the adaptive air guiding module consists of at least one rigid box section or a convergent element fastened to the structural air guide; preferably they comprise toward the front a peripheral flexible edge providing air tight and adaptable contact with the front bumper of the vehicle. The box section is advantageously fastened to the front surface of the technical front surface by indexing and screwing. In order to take account of the impact beam which generally cuts across the front of the technical front surface, there are preferably provided at least two box sections, respectively an upper and a lower box section, for adaptive air guiding, arranged on either side of said impact beam. Each of the box sections is fastened to the front surface of the structural air guide about an upper or lower opening which is formed there.

Advantageously, one of said openings can receive, optionally, a cassette of pivoting flaps controlled to regulate the flow of air through said opening. Advantageously, the shut-off flaps cassette is arranged in the lower opening, because this is in theory the main air inlet, and substantially in vertical alignment with the impact beam, giving it good resistance to impacts, in particular front end impacts at under 16 km/h (Danner impacts).

An inner surface of the receiving housing co-operates with a seal borne by the cooling kit to provide sealing. The receiving housing is advantageously in the form of a box section of rectangular cross section and it preferably comprises at the front a peripheral shoulder serving as a stop for the seal borne by the cooling kit. This seal is preferably formed on an envelope or sleeve surrounding the cooling kit, for example in the form of a lip articulated at the front of said envelope.

The invention also relates to a motor vehicle provided with an air guide having all or some of the preceding features.

Finally, the invention relates to a range of at least two different vehicles of the type mentioned above, characterized by an identical structural air guide for the vehicles of different models but at least one different adaptive air guiding module and/or a different technical front surface equipment module. Such a range may, for example, combine the various sedan models while another range will combine the models of minivan type. Within a range, the various models have the same structural air guide and differ only in terms of the specific interfaces between said air guide and the surroundings (body, engine).

BRIEF DESCRIPTION OF THE DRAWINGS

Other features and advantages of the invention will become apparent from the following description of a number of exemplary embodiments. Reference will be made to the appended drawings in which:

FIG. 3 represents the same structural air guide with its technical front surface modular equipment in position, and, in exploded form, the modular adaptation air guides, FIG. 4 represents the same structural air guide with its technical front surface modular equipment and the modular adaptation air guides in position, FIG. 6 is a schematic view in longitudinal section of the device of the invention with the cooling kit in a first position, FIG. 7 is a schematic view in longitudinal section of the device of the invention with the cooling kit in a second position, and FIG. 8 is a schematic view showing the sealing of the cooling kit in the structural air guide of the invention.

DETAILED DESCRIPTION

Figure 1:
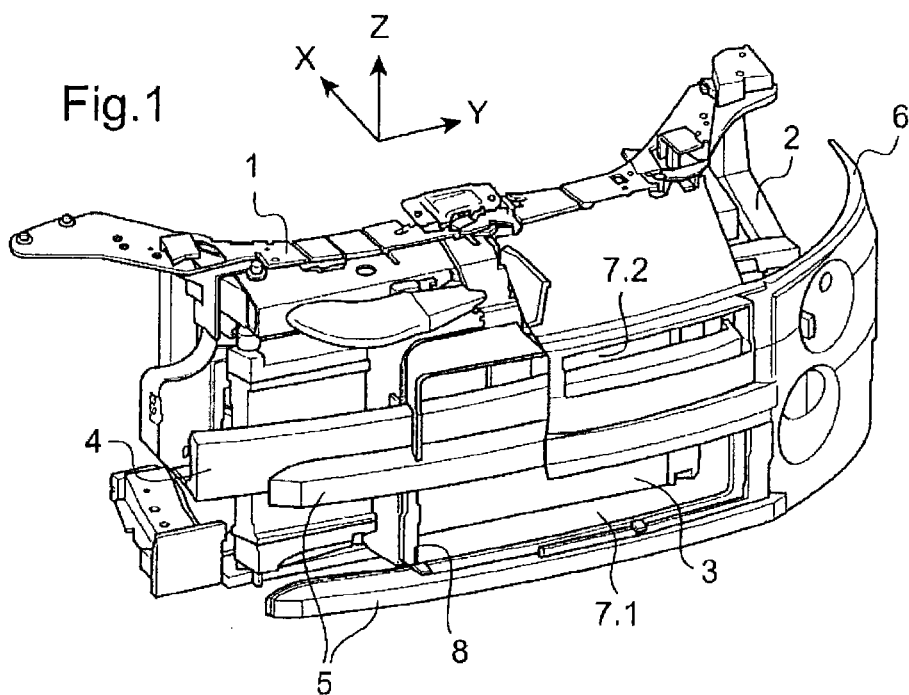
FIG. 1 is a cut-away perspective view of the front of a conventional vehicle.

FIG. 1 illustrates general notions. It shows an engine compartment at the front of a vehicle of a conventional type. From the rear forward, there is:

The technical front surface 1 which serves as a structural vertical support for a certain number of components, (in particular the hood stops, the hood lock support, etc.) and is fastened securely to structural elements of the chassis, for example to parts connected to the side rails 2.

The vertical radiator 3, which can be fasted with overhang on the technical front surface 1, (which is then load-bearing) or to a lower crossmember (crossmember below the radiator) not represented in FIG. 1 (but visible at 64 in FIG. 5, which represents the particular arrangement of the invention).

The transverse impact beam 4 which is connected in a way which has not been represented to structural elements of the chassis, theoretically to the front of the side rails 2. The impact beam cuts across the space in front of the radiator 3.

The shock absorber 5 of the bumper 6 here in the form of two, lower and upper, transverse profiles. The upper profile here is situated in front of the impact beam 4. The bumper 6 comprises, in the usual way, a front face, wrap around ends, and a lower spoiler part which continues rearward under the front of the vehicle.

In the bumper 6, one opening (at least), and in this instance two openings 7.1 and 7.2, optionally provided with grilles, allow cooling air to enter, which air is then directed toward the radiator 3 by a suitable air guide 8. In practice, the inlet 7.1 may be the main inlet and the inlet 7.2 may or may not be used.

In the vehicle of the prior art, the technical front surface, whether or not it is load-bearing, is specific to each car model.

Figure 2:
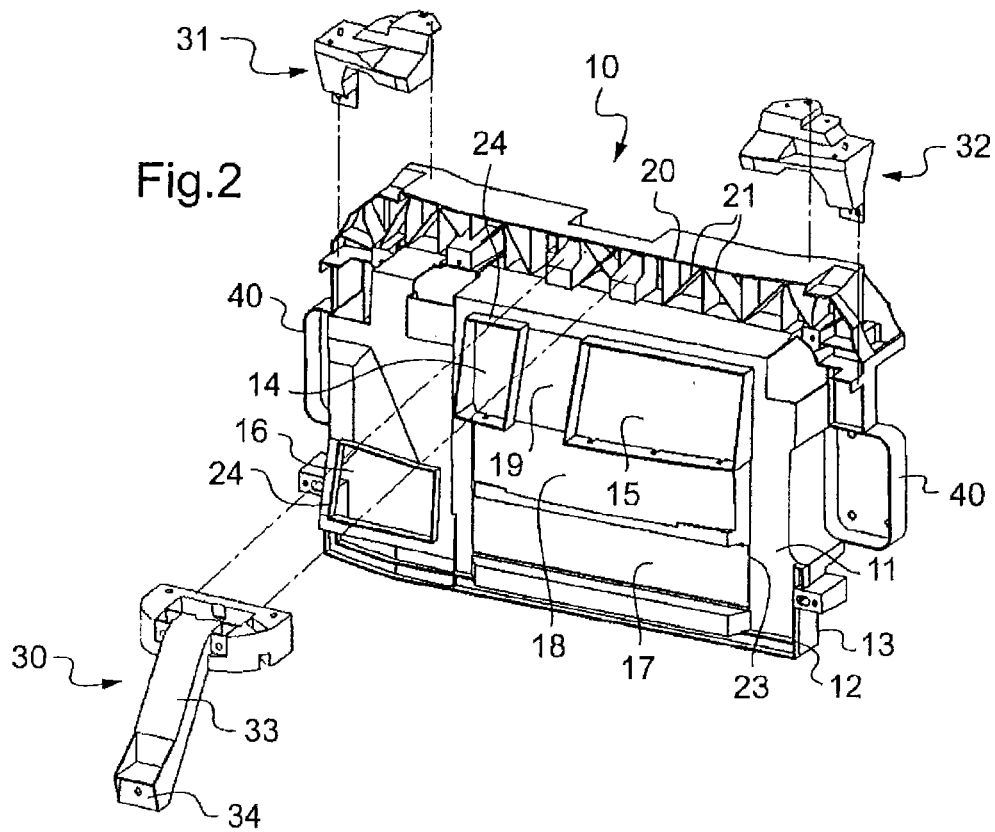
FIG. 2 is a perspective view of the structural air guide according to the invention and, in exploded form, of its technical front surface modular equipment.

According to the invention, represented in FIG. 2 and the following figures, there has been incorporated in a single standardized part a structural air guide with a technical front surface function which is complemented by modular adaptation guide elements and technical front surface equipment.

FIG. 2 shows the standard structural air guide or platform 10 in a position for receiving three modular technical front surface equipment items. The guide 10 is a substantially rectangular rigid part having a certain thickness, for example produced in molded plastic, with optionally local reinforcements made of plastic or metal. It essentially comprises:

A main zone 11 in the form of a rectangular frame comprising a front surface 12 and a rear surface 13. The front surface 12 comprises through openings 14, 15, 16, 17 of diverse shapes and sizes for the passage of the air and which are intended to receive at the front, as will be seen further on, adaptation air guides or convergent elements. The rear surface 13 forms a rectangular box section intended to receive the cooling kit, as will also be seen further on.

An upper zone or border 20 with a lattice beam structure reinforced by a plurality of vertical and oblique partitions 21. This border 20 also comprises fastening zones for modular technical front surface equipment items 30, 31, 32.

Zones 40 for fastening the structural air guide to the body of the vehicle, here in the form of lateral fastening lugs.

In the embodiment represented in FIG. 2, the front surface 12 comprises a horizontal fascia 18 corresponding to the location of the impact beam 4 which is situated just in front after assembly (cf. also FIGS. 5, 6 and 7) and a vertical central fascia 19 corresponding to the passage of a front connecting strut 33 of the equipment item 30. The openings 17, 18, 19 are contained in a rectangular subframe 23 corresponding substantially to the shape of the cooling kit which is inserted behind in the receiving box section. The opening 16 can be used for another cooling equipment item such as the charge air radiator, or intercooler, of a turbo charged vehicle. Each opening 14-17 can be surrounded by a border 24 perpendicular to the front surface 12 of the guide 10 (cf. also FIGS. 6 and 7) making it possible to promote the placement and the sealing of the adaptive adaptation guides 40, 50 which will be placed at the front of the openings 14-17 (cf. FIG. 3).

FIG. 2 shows three technical front surface equipment items 30, 31 and 32 intended to be fastened respectively to the center and to the ends of the upper border 20 of the air guide 10. Each of these accessories corresponds to a specific version of the vehicle, by contrast with the air guide 10 which is standard: each accessory is therefore an adaptive interface between the standard air guide and the specific body of the vehicle. These accessories can in particular be hood stop supports for the lateral accessories 31 and 32 and, for the central accessory 30, a lock support. The accessories 31 and 32 are inserted vertically into a suitable housing of the upper border 20 by shape complementarily; optionally a set of pins (for example on the border) and of slots (for example on the accessory) makes it possible to guide the assembly operation and to serve as error-proofing means between left and right part. Fastening is done, for example, by screwing the accessories 31, 32 onto the border 20. The central accessory 30 is fastened to the border 20 from the front, with once again a set of complementary forms allowing guiding and retention in position, with fastening by screwing. The central accessory 30 comprises, toward the front and toward the bottom, a connecting strut 30 which can be fastened to the impact beam 4 by means of a fastening part 34.

FIG. 3 shows the accessories 30, 31, and 32 in a fastened position and shows, in an exploded form, awaiting fastening, the adaptive air guides or lower 40 and upper 50 specific inlet convergent elements which conduct the air from the grilles of the front body to the standard air guide 10. The lower convergent element 40 comprises two rigid box sections 41, 42 intended to be fastened to the openings 16 and 17 of the air guide 10, possibly co-operating for sealing purposes with the borders 24 of said openings. Fastening takes place by means of various fastening tabs 43 or 44 co-operating with screwing zones such as 45 on the air guide 10 or zones of the impact beam 4. At the front of the rigid box sections, a flexible part 46, 47 effects the air tight application of the convergent elements on the front body part. This flexible part can be unique for the two rigid box sections 41, 42 as represented, or consist of two flexible guides. Those parts are highly specific to the equipped vehicle. Likewise, the upper specific convergent element 50 comprises, on the one hand, rigid box sections 51, 52 intended to join up with the openings 14, 15; these box sections are here separated by a rigid bridge 58 intended to leave space for the connecting strut 33 of the accessory 30. These rigid elements 51, 52, 58 are extended toward the front by flexible elements 56, 57, 59 intended to adapt exactly to the shape of the body at this point.

FIG. 4 represents these same elements once mounted on the air guide 10.

Figure 5:
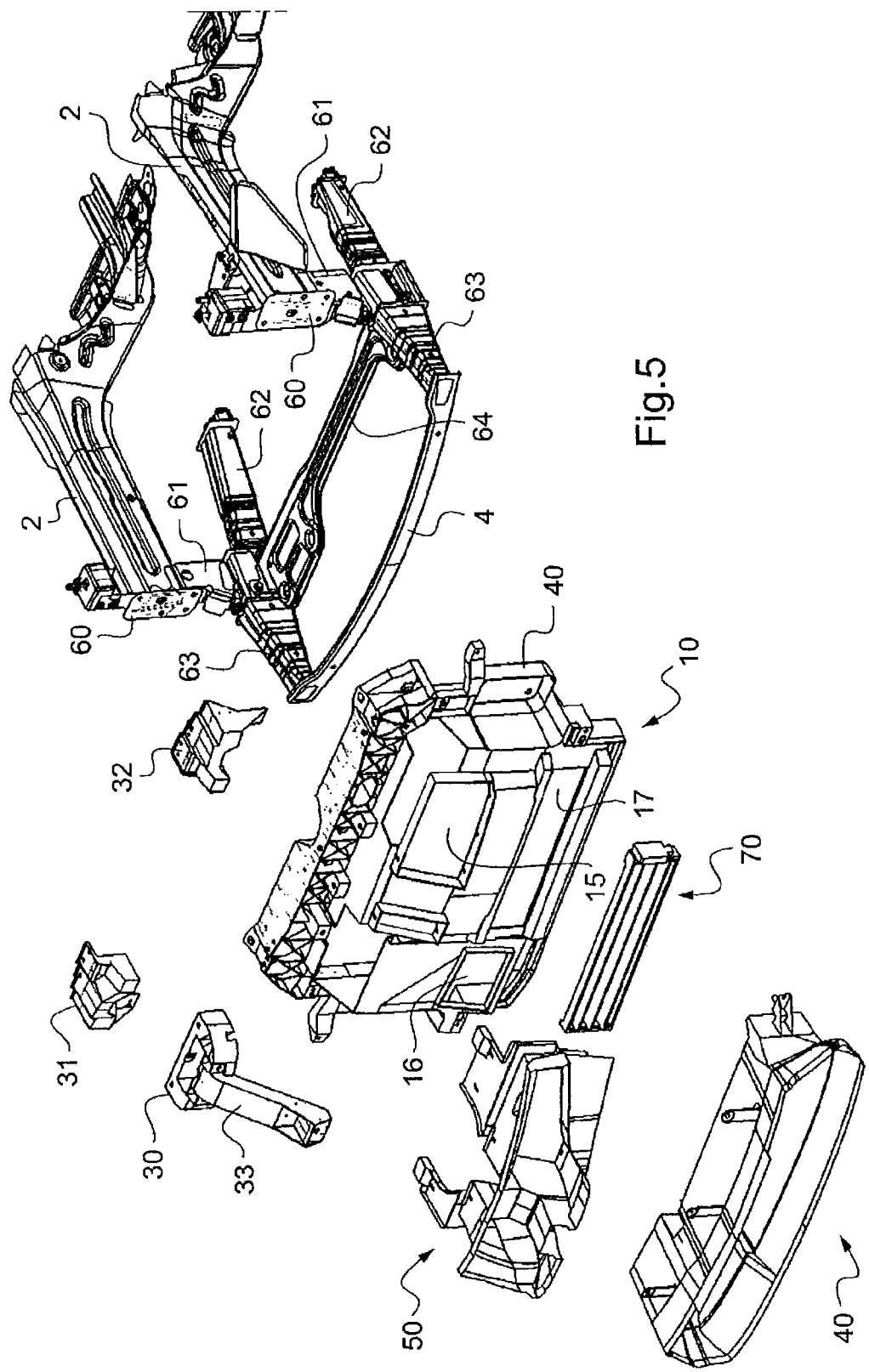
FIG. 5 is an exploded view of the structural air guide of the invention and of its modular elements, and also of the body of the vehicle in which it is incorporated.

FIG. 5 represents in exploded form, the installation of the air guide of the invention on the body. It shows the upper side rails 2 of which the end bears a rectangular fastening flange 60 to which will be fastened the fastening lug 40 of the air guide 10. The front ends of the upper side rails 2 are connected by hangers 61 to lower auxiliary side rails 62 at the front of which are fastened shock absorbing devices 63 and the impact bar 4 and between which is fastened the crossmember 64 below the radiator. The standard air guide 10 provided with its specific equipment items 30, 31, 32, on the one hand, and 40, 50 on the other hand, is therefore fastened to the side rails 2 and also optionally to the impact beam 4 as has been seen above. FIG. 5 also represents a frame with orientable flaps 17 which frame can be placed, optionally in the opening 17 of the air guide (it is also seen in dashed lines in FIGS. 6 and 7).

FIGS. 6 and 7 make it possible to see in cross section the arrangement of the cooling kit 80 in two positions which it can take according to the invention in the housing in the receiving box section formed at the rear surface 13 of the air guide 10 in the subframe 23 which is situated below the upper border 20 serving as beam. FIGS. 6 and 7 show the rigid 41, 42 and flexible 46, 47 parts of the air inlet convergent elements which are fastened facing the openings 15 and 17. The panel of orientable flaps 70 is represented in dashed lines in the opening 17. Also represented in dashed lines is the central accessory 30 with the strut 33 for connecting to the impact beam 4 which has also been sketched between and at the front of the openings 15 and 17. The accessory 30 can in particular receive the hood lock sketched at 36. The latter elements have not been repeated in FIG. 7 in order to simplify the drawing.

FIGS. 6 and 7 show the cooling kit 80 composed, for example, of the stack of a condenser 81, of a radiator 82 and of a motorized fan unit (helix) 83. This stack is surrounded by an envelope 84 made of plastic of which the front edge is configured as an articulated lip 85 by means of a thinning of material 86 and of a suitable rounded shape of the end. The rear surface 13 of the frame 23 forms a box section for receiving the kit 80 that is sufficiently deep to accommodate the kit in a manner in which it is inserted to a greater or lesser degree into the box section, as will be seen further on. The dimensions of the envelope 84 are chosen so that the end lip 85 buts on a peripheral shoulder 25 formed at the bottom of the receiving box section, whatever the position of the kit (forward position or rearward position, cf. further on). As it buts against this shoulder, the lip 85 is positioned automatically in a position promoting air tightness, under the effect of the air pressure which presses the lip 85 against the shoulder 25. Owing to the fact that the sealing lip 85 is thus positioned at the front of the envelope, that limits the height of the assembly at the level of the cooling kit 80.

The cooling kit 80 can be fastened autonomously by means, not shown, to elements of the body of the vehicle (in particular the crossmember 64 below the radiator), or else can be fastened to the air guide 10 which in this case plays a self-supporting technical front surface role.

In FIG. 6, the cooling kit has been represented in a rearward position, leaving a space of about 45 mm between the front of the kit 80 and the most forward elements such as the impact beam 4. In this rearward position, the cooling kit is less sensitive to impacts, in particular to the "Danner" impact test.

If, on account of the more bulky configuration of the engine, the space necessary for having this rearward position is not available, it is possible to place the cooling kit 80 in a forward position, as shown in FIG. 7.

The invention claimed is:

1. A structural air guide configured to be incorporated into a front of a vehicle in an engine compartment of the vehicle, behind at least one ventilating opening of a front face of the vehicle, the air guide being in a form of a substantially rectangular structure comprising:
   a front surface;
   a rear surface; and
   an upper border;

the substantially rectangular structure incorporating at least one radiator and further comprising means for fastening the at least one radiator to the engine compartment of the vehicle;

the front surface comprising a zone for fastening at least one adaptive air guiding module configured to conduct air from the at least one ventilating opening to the front surface;

the rear surface forming a housing for receiving a cooling kit comprising at least the at least one radiator, a condenser positioned upstream of the at least one radiator in a direction of air flow, and a fan positioned downstream of the radiator, the kit comprising sealing means co-operating with the housing the upper border comprising at least one zone for fastening technical front surface equipment modules;

wherein the housing for receiving the cooling kit, situated at a rear of the structural air guide, can receive the kit in at least two positions, including a forward position and a rearward position, a distance between the at least one radiator and the condenser being the same when the cooling kit is in the forward position and when the cooling kit is in the rearward position, and wherein the cooling kit includes an envelope that surrounds the at least one radiator, the condenser, and the fan such that the condenser is positioned upstream of the at least one radiator and the fan is positioned downstream of the radiator when the kit is in the forward position and when the kit is in the rearward position.

2. The structural air guide as claimed in claim 1, wherein the at least one zone for fastening technical front surface equipment modules provided on the upper border of the structural air guide comprises a plurality of zones for accommodating and for fastening equipment modules.

3. The structural air guide as claimed in claim 2, wherein the equipment modules are fastened by indexing and screwing.

4. The structural air guide as claimed in claim 2, wherein the plurality of zones are located at a center and at ends of the upper border.

5. The structural air guide as claimed in claim 2, wherein the radiator is more forward with respect to the housing when the cooling kit is in the forward position than when the cooling kit is in the rearward position.

6. The structural air guide as claimed in claim 2, wherein
the at least one radiator is more forward with respect to the housing when the cooling kit is in the forward position than when the cooling kit is in the rearward position,
the condenser is more forward with respect to the housing when the cooling kit is in the forward position than when the cooling kit is in the rearward position, and
the fan is more forward with respect to the housing when the cooling kit is in the forward position than when the cooling kit is in the rearward position.

7. A motor vehicle, comprising an air guide as claimed in claim 1.

8. A range of at least two different vehicles as claimed in claim 7, comprising an identical structural air guide but at least one different adaptive air guiding module and/or a different technical front surface equipment module.

9. The structural air guide as claimed in claim 1, wherein the at least one adaptive air guiding module comprises at least one rigid box section fastened to the structural air guide and comprising toward a front a peripheral flexible edge providing contact with a front bumper of the vehicle.

10. The structural air guide as claimed in claim 1, wherein the upper border is configured as a transverse beam.

11. The structural air guide as claimed in claim 1, wherein an inner surface of the housing co-operates with a seal borne by the cooling kit to provide sealing.

12. The structural air guide as claimed in claim 1, wherein the rear surface forms a box with a depth to receive the cooling kit in the forward position and in the rearward position, and the at least one radiator, the condenser, and the fan of the cooling kit are inserted further into the depth of the box of the rear surface in the forward position than in the rearward position.

13. A structural air guide configured to be incorporated into a front of a vehicle in an engine compartment of the vehicle, behind at least one ventilating opening of a front face of the vehicle, the air guide being in a form of a substantially rectangular structure comprising:

a front surface;
a rear surface; and
an upper border;
the substantially rectangular structure incorporating at least one radiator and further comprising means for fastening the at least one radiator to the engine compartment of the vehicle;
the front surface comprising a zone for fastening at least one adaptive air guiding module configured to conduct air from the at least one ventilating opening to the front surface;
the rear surface forming a housing for receiving a cooling kit comprising at least the at least one radiator, a condenser positioned upstream of the at least one radiator in a direction of air flow, and a fan positioned downstream of the radiator, the kit comprising sealing means co-operating with the housing
the upper border comprising at least one zone for fastening technical front surface equipment modules;
wherein the housing for receiving the cooling kit, situated at a rear of the structural air guide, can receive the kit in at least two positions, including a forward position and a rearward position, the radiator being more forward with respect to the housing when the cooling kit is in the forward position than when the cooling kit is in the rearward position, and
wherein the cooling kit includes an envelope that surrounds the at least one radiator, the condenser, and the fan such that the condenser is positioned upstream of the at least one radiator and the fan is positioned downstream of the radiator when the kit is in the forward position and when the kit is in the rearward position.

14. The structural air guide as claimed in claim 13, wherein
the condenser is more forward with respect to the housing when the cooling kit is in the forward position than when the cooling kit is in the rearward position, and
the fan is more forward with respect to the housing when the cooling kit is in the forward position than when the cooling kit is in the rearward position.

* * * * *